Patented Feb. 27, 1934

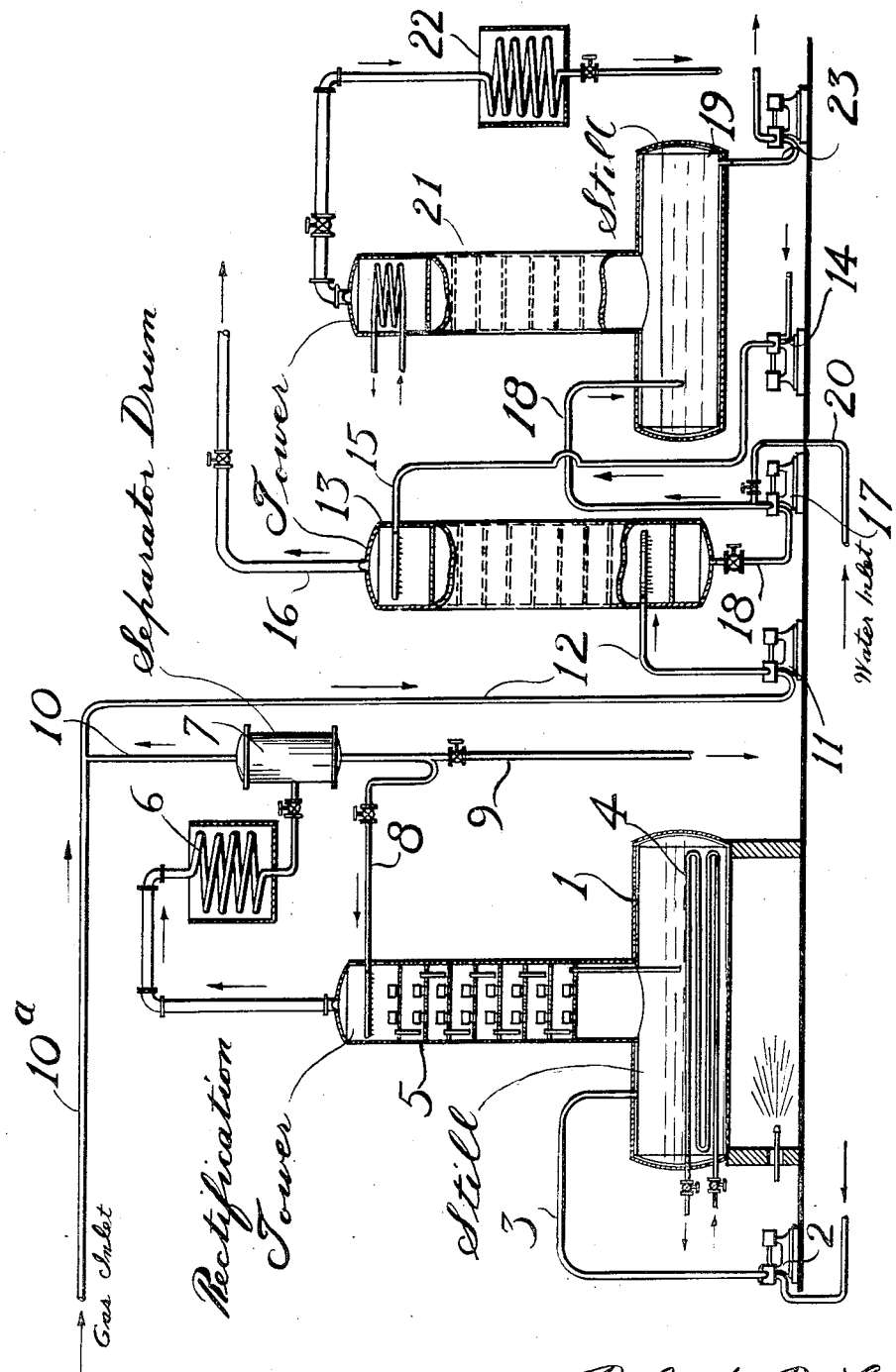

1,949,211

UNITED STATES PATENT OFFICE 1,949,211

PROCESS FOR THE PURIFICATION OF SECONDARY ALCOHOLS

Robert B. Lebo, Elizabeth, N. J., assignor to Standard Alcohol Company

Application May 17, 1929. Serial No. 363,750

9 Claims. (Cl. 260—156)

The present invention relates to the art of purifying alcoholic materials and to the production of valuable materials from the impurities so removed. My process will be fully understood from the following description and the drawing which illustrates one form of apparatus suitable for the process.

The drawing is a semi-diagrammatic view in elevation of apparatus constructed according to my invention and illustrates the flow of materials.

In the production of secondary alcohols by absorption of olefins in sulphuric acid and subsequent hydrolysis of the alkylsulphates and alkyl disulphates formed, it has been found that certain olefins which may be termed iso-olefins give rise to tertiary alcohols. It is difficult to purify olefins before absorption so that generally at least a small quantity of iso-olefins are present and therefore the bulk of the product, which comprises secondary alcohols, is contaminated with a smaller quantity of tertiary alcohols. In a previous application Serial No. 320,217, filed November 17, 1928, H. E. Buc discloses a method for removal of tertiary alcohols from less readily decomposable alcohols by preferential decomposition with mineral acid of low volatility. The present method is an improvement of the Buc method whereby the rate of removal of tertiary alcohol is greatly increased and the process is made continuous.

Referring to the drawing reference, character 1 denotes a still preferably constructed of lead or some other material equally resistant to the corrosive action of sulphuric acid. The material to be purified, which comprises a secondary alcohol containing a small amount of a tertiary alcohol for example isopropyl alcohol containing about 3 percent of tertiary butyl alcohol, is forced into the still by means of pump 2 and feed line 3 from any convenient source (not shown). Still 1 is fitted with a closed heating coil 4 or other suitable heating means and a rectification tower 5 of any preferred design although a bellcap plate tower as shown is most suitable. The still contains a relatively large quantity of dilute sulphuric acid and a small quantity of a catalyst which will be disclosed below.

Vapor from the top of the tower is conducted to a condenser 6 from which distillate mainly consisting of isopropyl alcohol containing but a small fraction of the tertiary butyl or other tertiary alcohol originally present in the alcohol charged and uncondensed vapor comprising iso-olefins are discharged into a separator drum 7. The iso-olefins have been produced by the decomposition of the tertiary alcohols and in the case when tertiary butyl alcohol is the only undesirable product in the alcohol charged, the uncondensed vapor will consist of isobutylene. The major quantity of the distillate is returned to tower 5 by reflux line 8 and a smaller quantity is withdrawn by line 9 to storage (not shown) purified of the tertiary alcohols to the degree desired, depending on the conditions of operation. The reflux is returned to the still in the usual manner.

Uncondensed vapor comprising mainly iso-olefins is withdrawn from the separator 7 by line 10 and may be combined with another gas from any other source (not shown) containing isoolefins by line 10a. The mixture may be compressed by booster 11 and forced by pipe 12 into an absorption system comprising a tower 13. The gas is fed into the lower part of the tower and in flowing upward contacts with sulphuric acid, preferably 60–70% $H_2SO_4$ by weight which is introduced by pump 14 and line 15 into the top of the tower. Any unabsorbed gas is removed by line 16 and may be used as fuel or otherwise, as desired. Such unabsorbed gas may result from incomplete reaction of the iso-olefines with the sulfuric acid or it may consist of, for example, the saturated gaseous hydrocarbons introduced through line 10a in admixture with the iso-olefins. The reactive acid liquor is taken from the base of the tower by pump 17 through line 18 and into a still or treating chamber 19, which is also constructed of material resistant to acid. A measured quantity of water is forced into line 18 by pipe 20 to dilute the acid. The amount of water should be sufficient to dilute the acid to such a strength that the decomposition of tertiary alcohols during the distillation is reduced to a minimum.

Treating chamber 19 may be in the form of a still fitted with a tower 21 and if desired the still may be heated and tertiary butyl alcohol, may be distilled over, condensed in condenser 22 and collected in storage (not shown). The dilute acid may be withdrawn from still 19 by line 23 and concentrated in apparatus (not shown) for reuse in absorption tower 13.

In the operation of my process, a relatively large volume of dilute sulphuric acid is maintained in still 1 and the most suitable acid strength depends on the particular alcohols treated, for example, the acid may be between 20 to 40% $H_2SO_4$ by weight, conveniently 30% for removing tertiary butyl alcohol from isopropyl and ¼ to 2 pounds of catalyst may be added for every 100 gallons of acid. Where it is desired to remove small quantities of tertiary amyl alcohol from secondary butyl alcohol, an acid strength of 10 to 25% should be used, and for still higher alcohols, even weaker acids are necessary. Vanadium pentoxide is preferred although copper and aluminum, preferably in the form of salts, may be used. Since the reaction requires a certain time for its completion. depending on the temperature, catalyst, and the quantity of tertiary alcohol present, it has been found to be desirable to regulate the feed to about 20 gallons per hour per 100 gallons of acid held in the still, although the rate may be somewhat greater, say about 30 gallons per 100 gallons of acid. Still temperature is about 80–105° C. when isopropyl alcohol is treated and the vapor to the condenser is 7 to 10° cooler. The ratio of the quantity of distillate removed to that returned as reflux determines the purity of the product and this ratio will be about 1 to 5 or 1 to 7 to produce, for example, isopropyl alcohol containing not greater than 1% of tertiary butyl alcohol. A greater ratio may be used if the product desired may contain a larger quantity of tertiary butyl alcohol. The loss of secondary alcohol due to decomposition may be from .1 to .5%.

The gases or vapor resulting from the decomposition of tertiary alcohol is then preferably absorbed in sulphuric acid of about 60–70% by weight and if desired the absorption may be carried out in the presence of hydrocarbon oil. The acid liquor formed by such absorption may be subjected to any one of several different treatments. For example, the acid may be diluted to an acid strength corresponding to below about 15%, preferably below 10% $H_2SO_4$ by weight and the mixture may be distilled for recovery of tertiary alcohol. On the other hand, if desired, a relatively smaller quantity of water may be added in measured amount equal to about 1 molecule of water per molecule of olefin absorbed and the mixture held at an elevated temperature for a prolonged period. For example, if the temperature is about 80 to 90° C. then the time should be about 6 to 8 hours and may be shorter at higher temperatures. An oily layer separates from the aqueous acid liquor and the oil is then distilled and purified by washing with soda or the like. The purification may be done before distillation, if desired. A portion of oil derived from the purification of an isopropyl alcohol containing tertiary butyl alcohol and boiling between 100° and 102° F. was identified as di-isobutene. Other polymers such as di-isopentine, tri-isobutene and tri-isopentine may also be obtained from treatment of secondary alcohols containing tertiary butyl and tertiary amyl alcohols. These substances may be used in a variety of ways, for example, they are excellent blending agents for addition to gasoline.

My process is not to be limited by any theory of the mechanism of the process nor by any specific example given merely by way of illustration. My method is particularly adapted to the purification of isopropyl alcohol containing a smaller quantity of tertiary-butyl alcohol, but it may be used for other mixtures such as secondary butyl alcohol containing tertiary amyl alcohol. My invention is to be limited only by by the following claims in which I wish to claim all novelty inherent in the process.

I claim:

1. An improved process for purifying secondary alcohols by removing the tertiary alcohol, comprising subjecting a mixture of a secondary alcohol and a minor proportion of a tertiary alcohol to heat treatment at a temperature not exceeding 105° F. with aqueous sulfuric acid of not above 40 percent strength by weight and a catalyst which includes a compound of one of the elements of the group consisting of vanadium, aluminum and copper, for a prolonged period and removing the hydrocarbon formed by the decomposition of the tertiary alcohol.

2. Process according to claim 1 in which a small quantity of a substance containing vanadium is used as the catalyst.

3. Process according to claim 1 in which the sulphuric acid is below 25% strength by weight.

4. Process according to claim 1 in which the hydrocarbon formed by decomposition of the tertiary alcohol is separately treated with sulphuric acid under alcohol forming conditions and tertiary alcohol is distilled therefrom.

5. An improved process for continuously purifying isopropyl alcohol containing a minor quantity of a tertiary alcohol by removing the tertiary alcohol, comprising maintaining a body of such isopropyl alcohol and aqueous sulfuric acid of a strength not above 40% by weight in presence of a catalyst which includes a compound of one of the elements of the group consisting of vanadium, aluminum and copper, at a distillation temperature under atmospheric pressure, continuously feeding raw alcohol thereto, refluxing a part of the vapor formed by such distillation to the body of acid and alcohol, removing a part of such vapor as a distillate, together with vapor of hydrocarbons formed by decomposition of the tertiary alcohol, and separating undecomposed secondary alcohol from such hydrocarbons.

6. Process according to claim 5, in which the feed rate in gallons per hour of raw alcohol is not greater than about one-third of the volume of acid maintained under heat treatment.

7. An improved process for continuously purifying isopropyl alcohol, containing a minor quantity of tertiary butyl alcohol, comprising maintaining a body of such alcohol, vanadium pentoxide, and aqueous sulfuric acid of 20 to 40 percent strength by weight at a distillation temperature from about 80° to 105° C., continuously feeding raw material thereto, refluxing a part of the vapor formed by such distillation to the body of acid and alcohol, removing a part of such vapor as a distillate together with vapor of hydrocarbon formed by decomposition of the tertiary butyl alcohol, condensing vapor of isopropyl alcohol and removing uncondensed hydrocarbon vapor.

8. Process according to claim 1 in which a small quantity of a substance containing copper is used as the catalyst.

9. Process according to claim 1 in which a small quantity of a substance containing aluminum is used as the catalyst.

ROBERT B. LEBO.